United States Patent [19]
Faber et al.

[11] Patent Number: 5,223,318
[45] Date of Patent: Jun. 29, 1993

[54] TITANIA SUBSTRATES AND FABRICATION

[75] Inventors: Margaret K. Faber; John H. Hudgins, both of Corning, N.Y.

[73] Assignee: Corning Incorporated, Corning, N.Y.

[21] Appl. No.: 562,802

[22] Filed: Aug. 6, 1990

[51] Int. Cl.$^5$ .............................................. B23B 3/12
[52] U.S. Cl. ..................... 428/116; 55/523; 156/89; 428/188; 502/527
[58] Field of Search ............ 428/116, 188, 178, 304.4, 428/312.8, 317.9, 323, 328; 502/527; 55/523; 156/89

[56] References Cited

U.S. PATENT DOCUMENTS

| | | | |
|---|---|---|---|
| 3,112,184 | 11/1963 | Hollenbach | 264/59 |
| 3,444,925 | 5/1969 | Johnson | 165/166 |
| 3,790,654 | 2/1974 | Bagley | 264/177.11 |
| 3,926,799 | 12/1975 | Thomas et al. | 210/653 |
| 4,032,454 | 6/1977 | Hoover et al. | 210/323.1 |
| 4,041,591 | 8/1977 | Noll et al. | 29/890.034 |
| 4,041,592 | 8/1977 | Kelm | 29/890.034 |
| 4,060,488 | 11/1977 | Hoover et al. | 210/321.82 |
| 4,069,157 | 1/1978 | Hoover et al. | 210/321.82 |
| 4,126,178 | 11/1978 | Kelm | 165/165 |
| 4,483,944 | 11/1984 | Day et al. | 428/116 |
| 4,781,831 | 11/1988 | Goldsmith | 210/247 |
| 4,929,406 | 5/1990 | Abe et al. | 264/45.5 |

FOREIGN PATENT DOCUMENTS

| | | |
|---|---|---|
| 0320033 | 6/1989 | European Pat. Off. |
| 0345022 | 12/1989 | European Pat. Off. |
| WO89/00983 | 7/1988 | World Int. Prop. O. |

OTHER PUBLICATIONS

Larbot et al Feb. 1989 Journal of American Ceramic Society; vol. 72, No. 2, p. 257 New Inorganic Ultrafiltration Membranes: Titania & Zirconia.

Primary Examiner—Henry F. Epstein
Attorney, Agent, or Firm—Angela N. Nwaneri

[57] ABSTRACT

The invention features porous substrates or supports fabricated from titania powder(s) having mean particle size of at least 7 μm. The titania substrates are useful for supporting porous membranes for separation and filtration processes. The titania powders provide supports with mean pore sizes in the approximate range of 3 to 15 μm, a sharp or narrow pore size distribution, total Hg porosities of at least about 30%, and MOR strengths of 50 up to 280 or more Kg/cm$^2$. A combination of several different titania powders produced the best results. Titania membranes can be formed on the titania supports.

29 Claims, 1 Drawing Sheet

TITANIA SUBSTRATES AND FABRICATION

FIELD OF THE INVENTION

The invention pertains to porous titania substrates or supports for use in separating and filtering, and more particularly to membrane supports fabricated from sintered titania particles whose mean particle size is at least 7 micrometers.

BACKGROUND OF THE INVENTION

The use of alumina for substrates used in separation and filtration is well known, and is one of the most commonly used inorganic materials for this purpose.

While it has often been suggested that titanium dioxide can also be used for fabricating substrates and membranes for separating and filtering purposes, it has not been generally possible or desirable to do so until the present invention.

One of the major problems with titania materials is their small particle sizes. Most commercial titania powders are used in the paint industry as pigments. These powders rarely have mean particle sizes greater than 3 micrometers.

Such small particle sizes are not suitable for making membrane supports for use in gas separations and microfiltration or ultrafiltration. Powders having small particle sizes generally produce substrates with small mean pore sizes, thus substantially reducing the flux through the porous body of the support.

Titania materials are more expensive than alumina materials, and would not provide a cost effective substitute were it not for the fact that membranes of titanium dioxide have a greater throughput during aqueous separations. (See A. Larbot, J-P. Fabre, C. Guizard, L. Cot and J. Gillot, "New Inorganic Ultrafiltration Membranes: Titania and Zirconia Membranes" J. of Am. Ceramic Soc., 72[2], 257–61, 1989.) Also, titania membranes and membrane. supports that can be properly fabricated are generally more durable for use with acidic and basic solutions, and particularly for basic solutions.

More recently, attention has been focused on the dangers of utilizing alumina substrates for processing water, foodstuffs and other comestibles, although it has not been conclusively determined that aluminum or alumina leaching into such ingestible commodities is harmful.

This fact, in addition to the other aforementioned advantages, has spurred increased interest in fabricating substrates and membranes from titanium dioxide materials.

The invention has been able to obtain titania powders of desirable particle size and distribution, and process them into efficacious substrates.

The invention also reflects the discovery that certain unacceptable powders when combined in admixture with other acceptable titania powders provide a synergistic extrudate having properties greater than either powder standing alone.

The invention also addresses a method of how to mix, shape or form, and sinter these powders to provide substrates useful for supports for microfilter, ultrafilter or gas separation membranes.

DISCUSSION OF RELATED ART

In U.S. Pat. No. 4,060,488, issued to Hoover et al, for "Particulate Membrane Ultrafiltration Device", it is suggested that membrane supports and membranes can be fabricated from a wide variety of substances, including titania.

However, the aforesaid patent never teaches by way of example how such a membrane support and membrane could be constructed, nor does this patent teach how a membrane support can be fabricated with a particle size that provides pore sizing in the substrate that yields high fluid throughput as described herein.

In fact, the patent is devoid of any teaching of how the materials are formed and/or sintered to form a membrane or membrane support. Without this teaching, therefore, it is only conjecture whether an acceptable membrane or membrane support could be fabricated from materials other than alumina.

In U.S. Pat. No. 4,781,831 issued to Goldsmith for "Cross-Flow Filtration Device With Filtrate Flow Conduits And Method Of Forming Same", porous material including titania, defining a number of passageways, is used to form a substrate that is to pass retentate from the filtration device.

In the printed Japanese patent application no. 172764-1979, publication no. 95342-1981, for "Manufacturing Method of Honeycomb Shape Body for Catalyst Applications", issued to Matsushita et al, a process for fabricating catalyst substrates made from titania of uncertain particle size is disclosed.

This Japanese application differs from the present invention in several respects, including a different intended use for the fabricated substrates, and a teaching that such substrates should not be sintered or otherwise subjected to high temperature curing in excess of 800° C. This different processing is necessary to provide Matsushita et al with the preferred pore sizes and characteristics for their particular intended use, which is opposite in character to that of this invention.

In the International Application No. PCT/US88/02537, filed Jul. 26, 1988, International Publication No. WO 89/00983, published Feb. 9, 1989, entitled "Preparation of Titanium Ceramic Membranes", a procedure is disclosed for making a sol-gel containing continuous chains of titanium dioxide having polymeric oxygen bridging. This gel is used to form membranes which can be coated upon ceramic or glass supports or can be made to be self-supporting. The process for fabricating the gel requires the use of precursors of alkoxides for causing the formation of titanium hydroxide which precipitates rapidly from the solution. The sol-gels so formed can be fired at temperatures up to 500° C., without causing the gel to crack.

The present invention is distinguished from the aforementioned patent application, in that titania powder is used to form substrates to support membranes according to the present invention, which substrates are not disclosed or suggested by the reference, and in that the mean particle size of the titanium dioxide for the substrate of the current invention is at least 7 micrometers, which is way beyond the colloidal range of titania for membranes as contemplated by the reference. In addition, the present invention contemplates firing the titanium particles at temperatures exceeding 1,200° C.

SUMMARY OF THE INVENTION

The present invention features porous substrates or supports comprising essentially titania (titanium dioxide), that are useful in gas separations, microfiltration and ultrafiltration processes, and which provide greater flux or throughput of fluid passing through the porous mass of the substrates due, in significant part, to the mean pore size of the substrates being larger than has been possible with most commercially available titania powders for fabricating substrates.

The fabricated membrane support is formed of sintered titania particles having a mean particle size of at least 7 micrometers so as to yield, in the substrate, a mean pore size of approximately between 3 to 15 micrometers, preferably between about 5 and 10 micrometers, and a sharp or narrow pore size distribution.

The term "sharp or narrow pore size distribution" shall mean for the purposes of definition herein, the pore size difference between 10% and 90% of total Hg intrusion volume being no greater than 10 micrometers, and is preferably (and more commonly) between approximately 1 to 4 micrometers.

The total Hg porosity must be at least 30%, and more preferably equal to or greater than 40%.

The aforesaid pore sizing and Hg porosity contribute to the greater flux or throughput capability of the supports according to this invention.

In an advantageous embodiment of the invention, the Modulus of Rupture (MOR) strength of the support at room temperature should be least 50 or 140 Kg/cm$^2$, and should preferably be greater than 210 or 280 Kg/cm$^2$.

When the above definition was applied to 51 samples considered in accordance with this invention (including those made with single and mixed titania powders), the average difference was determined to be about 2.2 micrometers. For samples made with only mixed titania powders, the average difference was 3.0 micrometers.

"A titania substrate is shaped or formed and sintered at temperatures in the approximate range of from 1,100° to 1,460° Centigrade for a time (e.g. 1 to 8 hours—desirably 2 to 6 hours, but preferably 3 to 5 hours) sufficient to produce the aforesaid properties of mean pore size and porosity, and also MOR."

It is an object of this invention to provide an improved substrate to support a membrane for performing gas separations, microfiltrations and ultrafiltrations.

It is another object of the invention to fabricate titania substrates having physical and chemical characteristics of exceptional quality.

It is another object of this invention to provide new and useful titania substrates or supports having a honeycomb or multi-channel configuration with relatively thin porous walls.

The range of particularly useful transverse cross sectional cell densities of honeycomb supports is believed to be as low as 7.75 cells/cm$^2$ and as high as about 250 cells/cm$^2$. Probably the more practical range of cell densities is from 15.5 cells/cm$^2$ to about 125 cells/cm$^2$. Although useful substrates with membranes on them have been made having 15.5-31 cells/cm$^2$, membranes can be easily formed on higher cell density (e.g. 93 cells/cm$^2$) substrates by use of low viscosity slips and sols.

"Thickness of walls of honeycomb supports should be sufficient for adequate strength and for flow/flux, e.g. at least about 0.254 mm and preferably about 0.38-1.02 mm."

It is yet another object of the invention to blend different titania powders into an extrudate having synergistically better qualities than does any titania powder standing alone, so that a blended powder substrate with a mean pore size between that of powders taken alone can be obtained without substantially increasing the pore size distribution.

It is yet another object of this invention to provide the new titania substrate combined with a finely porous titania membrane supported thereupon, for gas separation, microfiltration, and ultrafiltration processes.

Such membrane generally has pore sizes that reject solute or suspended particles or molecules (to be separated from fluids passing therethrough) of at least about 100 micrometers. The membrane is advantageously formed of multiple layers of fine titania powders and it generally has a thickness of about 3-50 micrometers.

BRIEF DESCRIPTION OF THE DRAWING

These and other objects of the invention will be better understood and will become more apparent with reference to the subsequent detailed description considered in conjunction with the accompanying drawings, in which.

DESCRIPTION OF THE PREFERRED EMBODIMENT

Generally speaking, the invention features substrates comprising titania powder(s), utilized in gas separation, microfiltration and ultrafiltration processes.

Titania membranes on alpha alumina supports have been found to provide greater throughput or flux than occurs with gamma alumina membranes on alpha alumina supports (see A. Larbot et al, hereinabove cited). It is advantageous to create a titania membrane support in order to form membrane filters or separation devices that are entirely constructed from titania. These support and membrane systems would also have a significantly increased durability in acidic and basic media than corresponding alumina systems, and may therefore have a longer operative life.

The invention reflects the discovery that, although it is often difficult to fabricate a membrane substrate with all the preferred or necessary parameters for commercial application utilizing titania powders, the properties can be synergistically enhanced by admixing several powders together. The resulting combination of powders can provide a substrate of higher parameters than that achieved by use of a single powder alone.

For the purposes of clarity, all similar elements will have the same designation throughout the figures.

Figure 1:
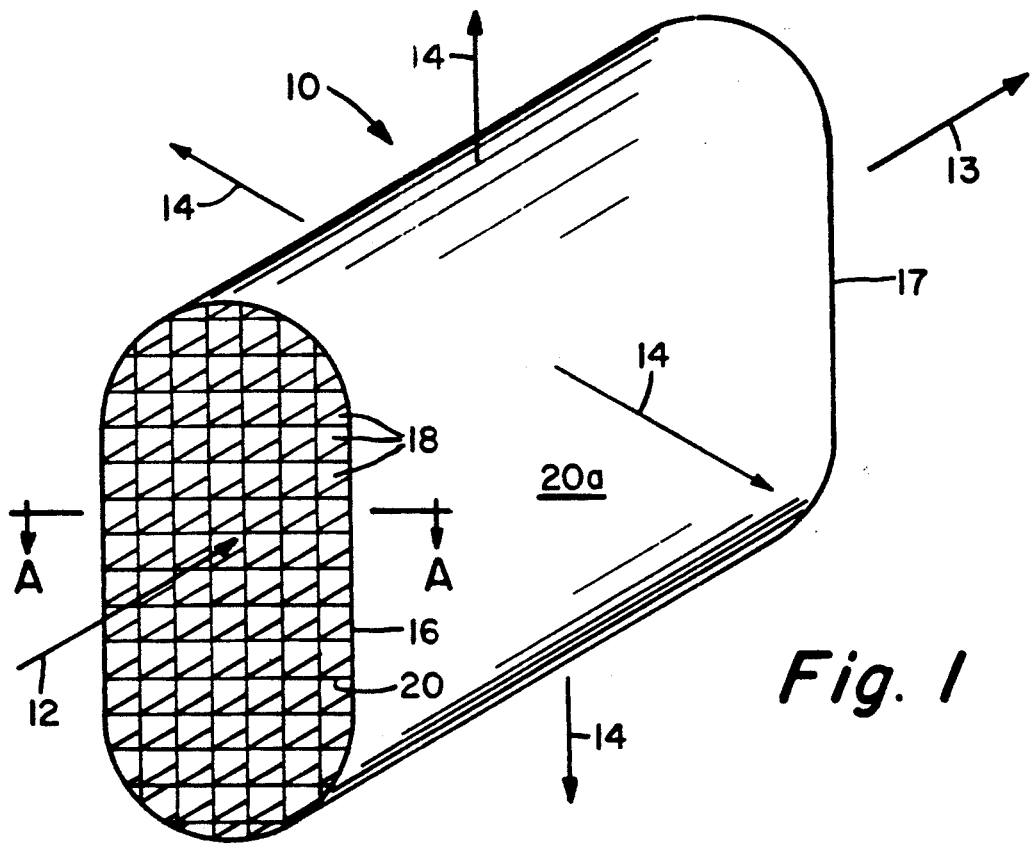
FIG. 1 is a perspective view of a typical membrane support of this invention.

Now referring to FIG. 1, a typical membrane support 10 of this invention in honeycomb configuration or shape is illustrated in perspective view.

Both surfaces of interior walls 20 and the interior surface of outer wall or skin 20a of the membrane support 10 are coated with titanium dioxide layers or membranes 22 of pore sizes that reject (do not pass) solute or suspended particles or molecules of about at least 100 micrometers as is conventional. Pore size range for microfiltration is generally from 100 micrometers to 200 angstroms. Pore size range for ultrafiltration is generally from 200 angstroms to 10 angstroms. Pore size range for gas separations is generally from 10 angstroms to one angstrom. Common mean pore sizes for particle filtration range from about one micrometer maximum for microfiltration to about 30 angstroms minimum for ultrafiltration. These titania membranes 22 are therefore designed to separate or filter out certain fraction(s) or solute(s) from the feedstock fluid(s) which can be gas(es), liquid(s) or solution(s), not shown. The membrane support 10 at face 16 is fed a fluid under pressure (arrow 12) that flows along its longitudinal axis through cells 18, and the filtrate exits in the perpendicular direction from exterior wall 20a, as shown by arrows 14, while the residual unfiltered feedstock exits from opposite face 17 as shown by arrow 13. The filtrate is forced, by the applied pressure, to pass through the small sized pores of the membranes 22 and into the connected pores in walls 20 and 20a of the substrate. The filtrate exits the support (arrows 14) by traveling through the open porosity of the substrate walls, exiting through the uncoated exterior surface of the outer wall or skin 20a of the honeycomb structure.

In addition, the ends or faces 16 and 17 of the membrane supports can be coated with a non-porous material, not shown, such as a glass glaze, that is applied to a short length on the outer skin and to the outer surface of the cell walls on the faces of the membrane supports. This allows seals to be made on the filtration devices to carry out filtration and separation processes.

Figure 2:
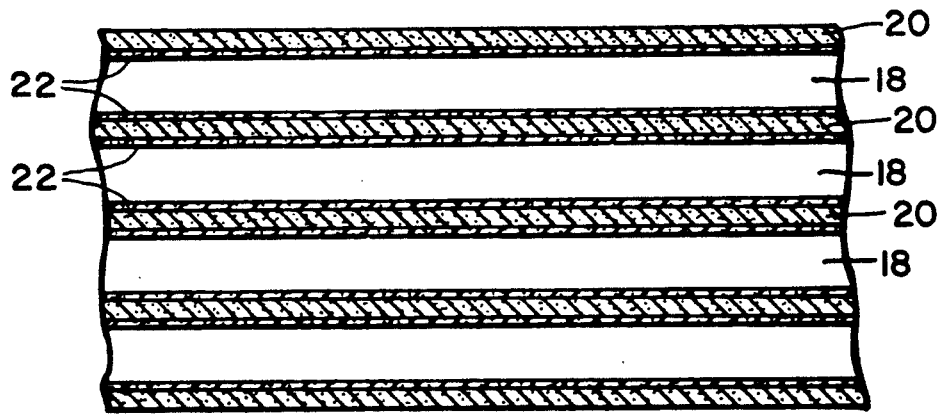
FIG. 2 is a cross-sectional view of a portion of the membrane support shown in FIG. 1, taken along lines A—A.

The membrane support is honeycombed with cells 18 at a cell density of at least 15.5 cells per square centimeter and as much as 31, 62, 93 or greater cells/cm$^2$. Each cell 18 extends the length of the membrane support 10, as better illustrated in FIG. 2.

The membrane support 10 must withstand the pressures of the introduced feedstocks. Therefore, sufficient structural strength must be achieved in the support during the fabrication process to withstand such pressures in an approximate range from 0.7 to 105 Kg/cm$^2$. The relative strength of extruded substrates can be compared using four point Modulus of Rupture (MOR) strength measurements.

Preferably, the membrane support 10 is constructed by mixing titania powder(s) with binder and plasticizer, such as methyl cellulose and water. Other aids may be added, such as lubricants (e.g. sodium stearate), dispersants, wetting agents, and/or surfactants, to provide an even dispersion of the titania particles and to improve the uniformity of the formed substrate.

In a preferred procedure the mixture is fed through an extrusion die, e.g. as shown in U.S. Pat. No. 3,790,654, in order to obtain the honeycomb cross-section illustrated in the figures.

The substrate is then conventionally dried, e.g., at room temperature or up to about 100° C. for a time sufficient to evaporate the water (usually about 4 hours) and is then sintered by firing at temperatures ranging from 1,100° to 1,460° Centigrade for a time sufficient to develop the appropriate properties of the substrate (usually about 4 hours).

Most titanium dioxide powders that are commercially available have mean particle sizes of only 1 or 2 micrometers, and are often sub-micron in size. These particles are too small for the fabrication of the inventive membrane supports, which require a mean pore size of about 3 to 15 micrometers and desirably 3 to 10 micrometers. Titania powders for the invention must have a mean particle size of at least 7 micrometers. Particle size measurements generally have a covariance of ±3.5%. In our preferred practice of the invention, powders are obtained from SCM Chemicals, Inc. of Baltimore, Md. and Kemira, Inc. of Savannah, Ga., having respective formula designations of VC Titanium Dioxide and UNIT-930 Titanium Dioxide, respectively. Substrates made from these powders are given designations of VC and UNITi-930 hereinafter for the purposes of brevity, respectively.

The VC powder had the following particle size range: 90 volume % at 21.33 micrometers, 50 volume % at 12.54 micrometers, and 10 volume % at 7.12 micrometers.

A particle size range was determined for the UNITi-930 powder, as follows: 90 volume % at 38.05 micrometers, 50 volume % at 23.55 micrometers, and 10 volume % at 14.81 micrometers.

Suitably porous membranes, and particularly porous titania membranes, can be formed on the surfaces of the porous titania substrates as a single layer or desirably multiple layers, in which a porosity gradient is produced by use of fine particle size powders with successively smaller particle sizes. In general, the membranes are formed by dipping the substrates into a slip or sol for a specified amount of time, draining the slip or sol out, drying, and firing the coated substrates. The slips or sols can also be introduced by flowing them through the substrates, for example with a peristaltic or other pump. It may also be possible to spray the slips or sols through the membrane channels of the substrates.

A first membrane layer can be formed from a slip made by dispersing a commercial titania powder in water, by controlling the pH, utilizing organic dispersants, or combinations thereof.

Various binders and plasticizers may also be added to the slip to control its viscosity, as well as the drying and firing behavior of the slip coating. This may also reduce or prevent cracking.

Aqueous dispersions are most common, but it is also possible to use organic solvents, such as alcohol, to form the dispersions.

The initial slip layer can be formed with between 10 to 25 wt. % solids of Ferro 203-1A titania powder obtained from the Transelco Division of the Ferro Corporation. This powder has a typical particle size distribution of 90% at 4.38 micrometers, 50% at 1.9 micrometers and 10% at 0.45 micrometers, and it has a nitrogen BET surface area of 8.4 m$^2$/g. Slips made from this material are usually adjusted to a pH of about 8, roller milled and ultrasonicated before use.

A second slip can be prepared from about 10 to 25 wt. % solids of Titanox-1000 titania powder, obtained from NL Chemicals, Inc. This powder has a particle size distribution of 90% at 1.24 micrometers, 50% at 0.55 micrometers and 10% at 0.22 micrometers, and it has a BET surface area of 9.81 m$^2$/g. A slip of this titania powder is usually adjusted to a pH of about 5, roller milled and ultrasonicated.

A third layer may be added using a titania powder of finer particle size, with a surface area of about 50 m$^2$/g, having the trade designation of Degussa P25. Slips formed from this powder have a dilution of about 1 to 3 volume %. A typical organic dispersant that can be used for the slips is Darvan C obtained from R.T. Vanderbilt Co., Inc.

Membranes formed from these slips have individual layer thicknesses of about 1 to 10 micrometers and total multi-layered thickness of about 3 to 50 (preferably 3-20) micrometers. Each slip layer is dried, e.g. under ambient conditions, and a next slip layer may be applied. Several slip layers may be formed before performing a single firing step.

After the substrates have been coated with the slips, they are dried and fired at about 700°–1500° C., e.g. 1,000° C.

For membranes with pore sizes in the ultrafiltration or gas separation ranges, it is necessary to form additional layers to those noted above. Sols utilized for these additional layers are typically colloidal aqueous sols prepared from the hydrolysis and precipitation of metal alkoxides, such as aluminum sec-butoxide, titanium tetraisopropoxide, silicon ethoxide, or silicon methoxide. However, nonaqueous sols can also be used.

The aqueous sols are stabilized by pH control, usually with acids.

About 12 hours of heating under reflux conditions is also required. The preparation of these types of sols is well documented in the literature.

For typical titania sols, the membrane can be fired at approximately 300° C., resulting in pore sizes of about 30 to 50 Angstroms in diameter.

Utilizing the above VC and UNITi-930 powders, the following substrates were fabricated:

EXAMPLE 1

Various shaped samples of porous substrates were extruded of each powder separately. The powder was mixed with methyl cellulose, stearate aid and water similar to Example 2. Solid rods had 0.32 inch (0.81 cm) outer diameter. Open tubes had 0.5 inch (1.2 cm) outer diameter and 0.38 inch (0.97 cm) inside diameter. One inch (2.54 cm) outer diameter honeycombs had 100 cells per square inch (15.5 cells/cm$^2$) and wall thicknesses of 0.025 inch (0.63 mm). A variety of sintering temperatures were used for the samples. Hg porosity measurements (with ±5% covariance) were made on each substrate sample. The results shown in Table 1 below indicate that both powders provided substrates with very narrow pore size distributions, with the mean pore size being about 3 micrometers for VC substrates and 6–7 micrometers for UNITi-930 substrates.

Both powders also provided substrates with very high total porosities: at least about 42% for the VC substrates and at least about 52% for the UNITi-930 substrates, respectively, when sintered at 1,320° Centigrade or less for a period of four hours. It has been determined that a porosity of 40% is more than adequate for separation substrates.

Measurements of MOR at room temperature (with ±15% covariance) and of linear firing shrinkage were made on several substrate samples. The results are shown in Table 2 below. MOR of at least 140 kg/cm$^2$ was attained in VC substrates with sintering temperatures of about 1300° C. and greater. However, suitable strength results are attained with sintering temperatures of at least about 1200° C. or even as low as 1100° C.

While useful mean pore sizes obtained were generally similar throughout the sintering temperature range of 1150°–1460° C., more modest firing shrinkages were obtained by sintering temperatures not exceeding about 1350° C., whereas MOR strengths of at least about 140 to 210 kg/cm$^2$ were obtained in VC substrates by sintering temperatures of at least about 1200° or 1300° C.

TABLE 1

Porosity Data for TiO$_2$ Extruded Substrates

| Sample Sinter Temp (°C.) Time (Hrs) | VC Hg Porosity | | | | UNITi-930 Hg Porosity | | | |
|---|---|---|---|---|---|---|---|---|
| | Total Porosity (Vol %) | Pore Size Distribution | | | Total Porosity (Vol %) | Pore Size Distribution | | |
| | | 10% (μm) | 50% (μm) | 90% (μm) | | 10% (μm) | 50% (μm) | 90% (μm) |
| 1150/4 | 46.1 | 4.2 | 3.2 | 2.6 | 54.4 | 8.4 | 6.4 | 3.6 |
| 1175/4 | 47.5 | 8.0 | 3.4 | 2.4 | — | — | — | — |
| 1200/4 | 44.8 | 4.0 | 3.1 | 2.5 | 51.4 | 7.5 | 6.0 | 3.5 |
| 1250/4 | 45.6 | 4.0 | 3.2 | 2.5 | 52.4 | 8.7 | 6.9 | 4.4 |
| 1320/4 | 41.5 | 4.2 | 3.2 | 2.6 | 51.9 | 8.4 | 6.8 | 4.9 |
| 1390/4 | 31.8 | 6.0 | 2.7 | 2.5 | 49.8 | 8.5 | 7.0 | 5.3 |
| 1460/4 | 36.4 | 4.2 | 3.3 | 2.6 | — | — | — | — |

TABLE 2

Physical Properties of TiO$_2$ Extruded Substrates

| Sample Sintering Temp (°C.) | VC | | UNITi-930 | |
|---|---|---|---|---|
| | Mean MOR (Kg/cm$^2$) | Linear Firing Shrinkage (%) | Mean MOR (Kg/cm$^2$) | Linear Firing Shrinkage (%) |
| 1150 | — | 2.6 (est.) | 62.9 ± 6.7 | 8.2 |
| 1175 | 57.8 ± 11.2 | 2.3 | — | — |
| 1250 | — | 3.2 | — | 9.2 |
| 1320 | 240.9 ± 45.1 | 5.1, 4.6 | 97.7 ± 14.9 | 9.5 |
| 1390 | 513.9 ± 159.6 | 11.1 | — | 10.6 |
| 1460 | 411.0 ± 73.0 | — | — | — |

EXAMPLE 2

Because the Kemira powder had a larger mean particle size and provided very high porosity values, it was decided to mix the Kemira and SCM powders in admixture in an attempt to obtain an improved extruded substrate.

It was surprising that a substrate was obtained with a mean pore size between that obtained from substrates made from either of the two powders alone, without substantially increasing the pore size distribution.

Since the flux or throughput of the substrate depends upon the square of the pore size, the increase in the mean pore size was calculated to have a significant effect upon the flux for this mixture.

Extruded substrates were formed of mixtures of both powders with water, Methocel methyl cellulose and sodium stearate (an extrusion aid), in the following respective parts by weight as set forth below in Table 3. Rods had a 0.32 inch (0.81 cm) diameter. Honeycombs had a cell density of 100 cells/inch$^2$ (15.5 cells/cm$^2$) and a one inch (2.54 cm) outer diameter.

TABLE 3

Extrusion Compositions of Mixed VC TiO$_2$/UNITi-930 TiO$_2$ Substrates

| Sample | VC TiO$_2$ | UNITi 930 TiO$_2$ | K75 Methocel | Aid | Water |
|---|---|---|---|---|---|
| 1 | 5 | 95 | 7.2 | 1.0 | 20 |
| 2 | 10 | 90 | 7.2 | 1.0 | 21 |
| 3 | 12 | 88 | 7.2 | 1.0 | 18 |
| 4 | 15 | 85 | 7.2 | 1.0 | 18 |
| 5 | 90 | 10 | 7.2 | 1.0 | 19 |

Tests were performed on the above-mentioned substrates. The test results are presented in Table 4.

TABLE 4

| | Physical Properties of Mixed VC/UNITi-930 Substrates Sintered at 1320° C. | | | | | |
|---|---|---|---|---|---|---|
| | Hg Porosity | | | | Water Density | |
| | Total | Pore Size Dist. | | | Total | Mean |
| Sample | Porosity (Vol. %) | 10% | 50% (μm) | 90% | Porosity (Vol %) | MOR (Kg/cm²) |
| 1 | 36.5 | 7.7 | 5.5 | 3.8 | 41.0% | 220.1 |
| 2 | 39.3 | 7.2 | 5.4 | 4.0 | 40.6% | 250.6 |
| 3 | 42.2 | 9.0 | 4.5 | 3.2 | 41.0% | 268.6 |
| 4 | 37.2 | 5.3 | 4.6 | 3.6 | 39.1% | 305.8 |
| 5 | 41.9 | 4.0 | 3.6 | 3.0 | — | 432.0 |

A range of substrate compositions from less than 5% VC powder to more than 90% VC powder mixed with UNITi-930 powder produced acceptable substrates. Sample 1, having 5% VC/95% UNITi 930, had the largest mean pore size of about 5.5 micrometers, but was slightly weaker than the other compositions with a MOR of 220.1 Kg/cm². Sample 4, with 15% VC/85% UNITi-930, was stronger at 305.8 Kg/cm², but had a smaller mean pore size of 4.6 micrometers. Sample 5, at 90% VC/10% UNITi-930, had the highest MOR strength of 432 Kg/cm², and a mean pore size of 3.6 micrometers.

It appeared that a composition somewhere in between Samples 1 and 4 would provide the best result when the mean pore size is the parameter of interest. Sample 2 and Sample 3, comprising 10% VC and 12% VC powder, respectively, were found to have mean pore sizes of 5.5 micrometers and 4.5 micrometers and MOR strengths of 251 Kg/cm² and 269 Kg/cm². On the other hand, when the MOR strength is the parameter of most interest, Sample 5 provides the highest strength of 432 Kg/cm², but has a mean pore size of 3.6 micrometers which is well within our desired range.

All of the above compositions were found to have a porosity approaching 40% in volume by both Hg porosimetry and water density analysis.

Thus, by mixing the VC powder and UNITi-930 powder, it is possible to obtain either substrates with larger mean pore sizes than can be obtained for substrates made from the preferred VC powder considered alone, or to obtain substrates that are stronger than substrates made from the VC powder alone, and yet still have desirable mean pore sizes.

Each of the sintered substrates provided a narrow pore size distribution in an approximate range of between 1 to 4 micrometers, as required for separation applications.

Substrates can be formed or shaped by any suitable or known fabricating technique utilizing conventional ceramic processes, and substrates can be formed having the honeycomb configuration or a multi-channel configuration obtainable by processes other than direct extrusion (e.g., see U.S. Pat. Nos. 3,112,184 and 3,444,925).

Useful substrates according to the invention described herein have been made in accordance with U.S. Pat. No. 4,877,766 so as to have cell passages of equal hydraulic diameter.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequent appended claims.

What is claimed is:

1. A porous titania substrate for use as a support for a membrane in separations and filtrations, formed of sintered titanium dioxide particles having a mean titanium dioxide particle size of at least 7 micrometers, and said substrate having a mean pore size of approximately between 3 to 15 micrometers, a sharp pore size distribution no greater than 10 micrometers and a total greater than approximately 30% by volume, all as determined by Hg porosimetry.

2. The titania substrate of claim 1, wherein the substrate has a Modulus of Rupture (MOR) of at least 50 Kg/cm².

3. The titania substrate of claim 2, wherein the total porosity is at least approximately 40%.

4. The titania substrate of claim 2, wherein the MOR is at least approximately 140 Kg/cm².

5. The titania substrate of claim 2, wherein the MOR is at least approximately 210 Kg/cm².

6. The titania substrate of claim 1, wherein the substrate mean pore size is approximately between 5 and 10 micrometers.

7. The titania substrate of claim 1, having a honeycomb configuration.

8. The titania substrate of claim 7, wherein a transverse cross-section of said honeycomb configuration has at least 7.75 cells per square centimeter.

9. The titania substrate of claim 7 wherein the wall thickness of the honeycomb support is at least 0.254 mm.

10. The titania substrate of claim 9 wherein the wall thickness of the honeycomb support is in the range between 0.38 and 1.02 mm.

11. The titania substrate of claim 1, wherein said substrate comprises more than one titania powder in admixture.

12. The titania substrate of claim 11, wherein said admixture comprises at least two titanium dioxide powders of different mean particle size, and a mean particle size of said admixed powders of at least 7 micrometers.

13. The titania substrate of claim 1, wherein sintering is accomplished at temperatures in the approximate range of from 1,100° to 1,460° C., for a time sufficient to develop said mean pore size and total porosity.

14. The titania substrate of claim 13, wherein the total porosity is at least approximately 40%.

15. The titania substrate of claim 13, wherein the Modulus of Rupture is at least approximately 210 Kg/cm².

16. The titania substrate of claim 13, wherein the Modulus of Rupture is at least approximately 280 Kg/cm².

17. The titania substrate of claim 13, wherein the mean pore size of the substrate is approximately between 5 and 10 micrometers.

18. The titania substrate of claim 13, having a honeycomb configuration.

19. The titania substrate of claim 18, wherein a transverse cross-section of said honeycomb configuration has at least approximately 7.75 cells per square centimeter.

20. The titania substrate of claim 1, wherein said substrate is sintered at temperature in the approximate range of from 1,100° to 1,460° C., for a time sufficient to develop said mean pore size and porosity.

21. The titania substrate of claim 1, having a mean pore size of approximately between 5 and 10 micrometers, a total porosity of greater than approximately 40%, and a Modulus of Rupture,(MOR) of at least 140 Kg/cm$^2$.

22. The titania substrate of claim 1, having a mean pore size of approximately between 5 and 10 micrometers, a total Hg porosity of greater than approximately 40%, and a Modulus of Rupture (MOR) of at least 210 Kg/cm$^2$.

23. The titania substrate of claim 1, said substrate having a finely porous titania separations membrane formed thereon.

24. The titania substrate of claim 23, wherein said membrane has pore sizes that reject solute or suspended particles or molecules, which are to be separated or filtered, of at least 100 micrometers.

25. The titania substrate of claim 23, wherein said membrane is formed of multiple layers of fine titania powders of successively smaller particle sizes.

26. The titania substrate of claim 25, wherein the total thickness of the multiple layers of fine titania powders is in the range between 3 and 50 micrometers.

27. The titania substrate of claim 26, wherein the total thickness of the multiple layers of fine titania powders is in the range between 3 and 20 micrometers.

28. The titania substrate of claim 23, wherein said membrane is formed of a single layer of fine titania powders, the membrane having a thickness of about 1 to 10 micrometers.

29. The titania substrate of claim 1, wherein the sharp pore size distribution is in the approximate range of between 1 and 4 micrometers.

* * * * *

UNITED STATES PATENT AND TRADEMARK OFFICE
CERTIFICATE OF CORRECTION

PATENT NO. : 5,223,318
DATED : June 29, 1993
INVENTOR(S) : Margaret K. Faber and John H. Hudgins It is certified that error appears in the above-indentified patent and that said Letters Patent is hereby corrected as shown below:

Column 3, line 25, insert --at-- after "be".
Column 3, line 35, delete " " ".
Column 3, line 39, delete " " ".
Column 3, line 60, delete " " ".
Column 3, line 63, delete " " ".
Column 5, line 68, "UNIT-930" should be --UNITi-930--.
Column 8, line 9, "Vo" should be --Vol--.
Column 8, line 21, "UNIT1-930" should be --Uniti-930--.
Column 10, line 12, insert --porosity-- after "total".
Column 10, line 67, "temperature" should be --temperatures--.
Column 11, lien 6, delete "," after "Rupture".

Signed and Sealed this

Twelfth Day of July, 1994

BRUCE LEHMAN

Attest:

Attesting Officer

Commissioner of Patents and Trademarks